(12) United States Patent
Yun et al.

(10) Patent No.: US 9,460,027 B2
(45) Date of Patent: Oct. 4, 2016

(54) DIGITAL RIGHTS MANAGEMENT SYSTEM

(71) Applicant: HGST Netherlands B.V., Amsterdam (NL)

(72) Inventors: Dai Yun, Beijing (CN); Toshiyuki Masue, Kanagawa (JP); Tatsuya Hirai, Tokyo (JP)

(73) Assignee: HGST NETHERLANDS, B.V., Amsterdam (NL)

( * ) Notice: Subject to any disclaimer, the term of this patent is extended or adjusted under 35 U.S.C. 154(b) by 31 days.

(21) Appl. No.: 14/605,687

(22) Filed: Jan. 26, 2015

(65) Prior Publication Data

US 2016/0217083 A1    Jul. 28, 2016

(51) Int. Cl.
*G06F 21/86* (2013.01)
*G06F 12/14* (2006.01)

(52) U.S. Cl.
CPC .......... *G06F 12/1458* (2013.01); *G06F 21/86* (2013.01); *G06F 2212/1052* (2013.01)

(58) Field of Classification Search
CPC combination set(s) only.
See application file for complete search history.

(56) References Cited

U.S. PATENT DOCUMENTS

| | | | |
|---|---|---|---|
| 5,629,980 A | 5/1997 | Stefik et al. | |
| 5,715,403 A | 2/1998 | Stefik | |
| 7,222,104 B2 | 5/2007 | Tadayon et al. | |
| 7,389,270 B2 | 6/2008 | Stefik et al. | |
| 8,032,679 B2 * | 10/2011 | Yamaguchi | G06F 13/128 |
| | | | 710/261 |
| 8,244,579 B2 | 8/2012 | Wang et al. | |
| 2003/0130953 A1* | 7/2003 | Narasimhan | G06F 21/10 |
| | | | 705/59 |
| 2007/0219917 A1 | 9/2007 | Liu et al. | |
| 2008/0065770 A1 | 3/2008 | Romero et al. | |
| 2010/0031373 A1* | 2/2010 | Hamid | G06F 21/10 |
| | | | 726/29 |
| 2012/0072995 A1* | 3/2012 | Crawford | G06F 21/105 |
| | | | 726/26 |
| 2012/0216289 A1* | 8/2012 | Kawaguchi | G06F 21/10 |
| | | | 726/26 |

FOREIGN PATENT DOCUMENTS

WO    2012164570 A1    12/2012

OTHER PUBLICATIONS

Stefik, et al., The Bit and the Pendulum, Balancing the Interests of Stakeholders in Digital Publishing, http://www.markstefik.com/wp-content/uploads/2011/03/1997-Bit-and-Pendulum-Stefik-Silverman.pdf, Xerox Palo Alto Research Center, Palo Alto, California 94304, 1997.
Supelec, Program—Specialization MRI, http://www.supelec.fr/222_p_14710/program-specialization-mri.html, Nov. 24, 2009.
GDF SUEZ SA, Contract for the transfer of usage rights of transit capacity, http://www.gdfsuez.com/wp-content/uploads/2012/04/3_subletting-contract-tsafinal24-02-2010-1.pdf, Feb. 2010.

(Continued)

*Primary Examiner* — Beemnet Dada
(74) *Attorney, Agent, or Firm* — Kunzler Law Group, PC

(57) ABSTRACT

Disclosed herein is a digital rights management system that includes a storage module that stores a usage right for digital content in a tamper-resistant portion of a memory. The system also includes a flag status module that generates a flag corresponding with a transfer status of the usage right, sets the flag to one of a plurality of transfer statuses, and stores the flag in the tamper-resistant portion of the memory. The transfer statuses include a status indicating a request for the usage right was generated by a device with a usage right recovery mechanism.

15 Claims, 5 Drawing Sheets

(56) References Cited

OTHER PUBLICATIONS

Chen, et al., Group-Based Authentication to Protect Digital Content for Business Applications, http://ir.lib.cyut.edu.tw:8080/bitstream/310901800/7032/1/8.pdf, Retrieved Oct. 17, 2013.

Gaber, Support Consumers' Rights in DRM: A Secure and Fair Solution to Digital License Reselling Over the Internet, University of Manchester, https://www.escholar.manchester.ac.uk/api/datastream?publicationPid=uk-ac-man-scw:159554&datastreamId=FULL-TEXT.PDF, 2012.

SAFIA License Group, Security Architecture for Intelligent Attachment Device Specifications, Protocol and Data Structure vol. 1, http://www.safia-lb.com/doc/spec/SAFIA_PDS1_V121-20101022.pdf, Version 1.21, Oct. 2010.

SAFIA License Group, Security Architecture for Intelligent Attachment Device Specifications, Interface for iVDR, http://www.safia-lb.com/doc/spec/SAFIA_IF_V122-20110916.pdf, Version 1.22, Sep. 2011.

* cited by examiner

DIGITAL RIGHTS MANAGEMENT SYSTEM

FIELD

This disclosure relates generally to digital rights management systems, and more particularly to flexibly managing the transfer of usage rights to prevent unauthorized recovery of usage rights.

BACKGROUND

Digital rights management systems are configured to control the usage of digital content. In general, digital rights management systems limit in various ways the ability to use and access digital content. For example, a digital rights management system may keep track of the transfer of or access to a limited number of usage rights (e.g., licenses) of digital content. The number of usage rights available can be determined by a seller or owner of the digital content. Conventionally, a digital rights management system stores usage right information in a storage device, transfers usage rights from the storage device to authorized user devices, and records transfer information in a log file.

In some instances, the transfer of usage rights may be interrupted due to a broken or lost connection. Following an interruption, it may be unclear whether the transfer of usage rights was completed, and whether a usage right associated with an incomplete transfer is recoverable. Accordingly, some digital rights management systems employ a usage rights recovery process where the log file is processed to ensure authorized usage rights can be recovered. The log file can be processed by analyzing conditions recorded in the log file, such as usage right identification and counts, and modifying the conditions to last known values.

SUMMARY

The subject matter of the present application has been developed in response to the present state of the art, and in particular, in response to problems and shortcomings of conventional digital rights management systems that have not yet been fully solved by currently available systems. For example, where usage rights are requested from both a user device with a usage right recovery mechanism and a user device without a usage right recovery mechanism prior to an interruption, during the recovery process, the transfer of usage rights to the user device without a usage right recovery mechanism may occur and not be recorded in the log file. Accordingly, during the recovery process, the user device with the usage right recovery mechanism may not be able to properly recover the usage right requested before interruption. Additionally, during the recovery process of conventional digital rights management systems, large quantities of usage right information, such as usage rights identification and counts, are recorded into and read from the log file. As the number of usage rights managed by the system increases, the corresponding increase of information stored in the log file can result in delays and inefficiencies when access to the log file is required. In general, the subject matter of the present application has been developed to provide a digital rights management system that flexibly, quickly, and efficiently manages the transfer of usage rights to prevent unauthorized recovery of usage rights that overcomes at least some of the above-discussed shortcomings of the prior art.

According to one embodiment, a digital rights management system includes a storage module that stores a usage right for digital content in a tamper-resistant portion of a memory. The system also includes a flag status module that generates a flag corresponding with a transfer status of the usage right, sets the flag to one of a plurality of transfer statuses, and stores the flag in the tamper-resistant portion of the memory. The transfer statuses include a status indicating a request for the usage right was generated by a device with a usage right recovery mechanism.

In some implementations of the system, the transfer statuses comprise a status indicating a request for the usage right was generated by a device without a usage right recovery mechanism. The transfer statuses can include a status indicating a request for the usage right has not been received.

In certain implementations, the system includes a usage right control module that denies a request for a transfer of the usage right to a device without a usage right recovery mechanism when the transfer status of the flag is set to the status indicating a request for the usage right was generated by a device with a usage right recovery mechanism. The request for the transfer of the usage right to a device without a usage right recovery mechanism can be made during a network interruption. The usage right control module can approve a request for a transfer of the usage right to the device with the usage right recovery mechanism when the transfer status of the flag is set to the status indicating a request for the usage right was generated by the device with the usage right recovery mechanism.

According to yet some implementations, the system can further include a tracking module that maintains a log file comprising a use history of the usage right. A copy of the flag can be merged into the usage right in certain implementations. According to certain implementations, the usage right recovery mechanism includes a recoverable usage right request module, where the device includes a non-recoverable usage right request module. The device with the usage right recovery mechanism can be a first device, the usage right recovery mechanism can include a recoverable usage right request module, and the system may further include a second device that is separate from the first device. The second device can be a non-recoverable usage right request module.

According to another embodiment a method for managing digital rights includes storing a usage right for digital content in a tamper-resistant portion of a memory. The method also includes generating a flag for the usage right, setting the flag to a first status, and storing the flag in the tamper-resistant portion of the memory. Additionally, the method includes receiving a request for the usage right from a device having a usage right recovery mechanism. The method also includes setting the flag to a second status in response to receiving the request.

In some implementations of the method, the second status indicates the request is a recoverable request. The method can also include receiving a request for the usage right from a device without a usage right recovery mechanism. Also, the method can include denying the request for the usage right from the device without the usage right recovery mechanism when the flag for the usage right is set to the second status. The request for the usage right from the device without a usage right recovery mechanism may be received during a network interruption. The method can also include updating a log file with use history information associated with the usage right.

According to certain implementations, the method includes receiving a request to recover the usage right from the device having a usage right recovery mechanism after a transfer of the usage right to the device having a usage right recovery mechanism has been interrupted. Also, the method can include transferring the usage right to the device having a usage right recovery mechanism in response to receiving the request to recover the usage right if the flag for the usage right is set to the second status. The method may include adding a copy of the flag to the usage right. Additionally, the method can include transferring the usage right to the device having a usage right recovery mechanism, and setting the flag to a third status indicating the usage right has been transferred.

In some implementations of the method, the usage right recovery mechanism is associated with a recoverable usage right request module of the device. The request for the usage right is received from the recoverable usage right request module. The device can include a non-recoverable usage right request module. The method can further include receiving a request for the usage right from the non-recoverable usage right request module, approving the request for the usage right from the recoverable usage right request module when the flag for the usage right is set to the second status, denying the request for the usage right from the non-recoverable usage right request module when the flag for the usage right is set to the second status, and approving the request for the usage right from the non-recoverable usage right requested module when the flag for the usage right is set to the first status.

According to yet another embodiment, a method for managing digital rights includes storing a usage right for digital content in a tamper-resistant portion of a memory, generating a flag for the usage right and setting the flag to a non-use status, and storing the flag in the tamper-resistant portion of the memory. Additionally, the method includes receiving a request for the usage right from a device having a usage right recovery mechanism and setting the flag to a recoverable status in response to receiving the request. Furthermore, the method includes transferring the usage right to the device having a usage right recovery mechanism and stopping the transfer of the usage right to the device having a usage right recovery mechanism in response to a network interruption. The method can also include receiving a request for the usage right from a device without a usage right recovery mechanism during the network interruption and denying the request for the usage right from the device without a usage right recovery mechanism when the flag is set to the recoverable status. Moreover, the method can include receiving a request to recover the usage right from the device having a usage right recovery mechanism after the network interruption is resolved, approving the request to recover when the flag is set to the recoverable status, and disapproving the request to recover when the flag is set to the non-use status.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
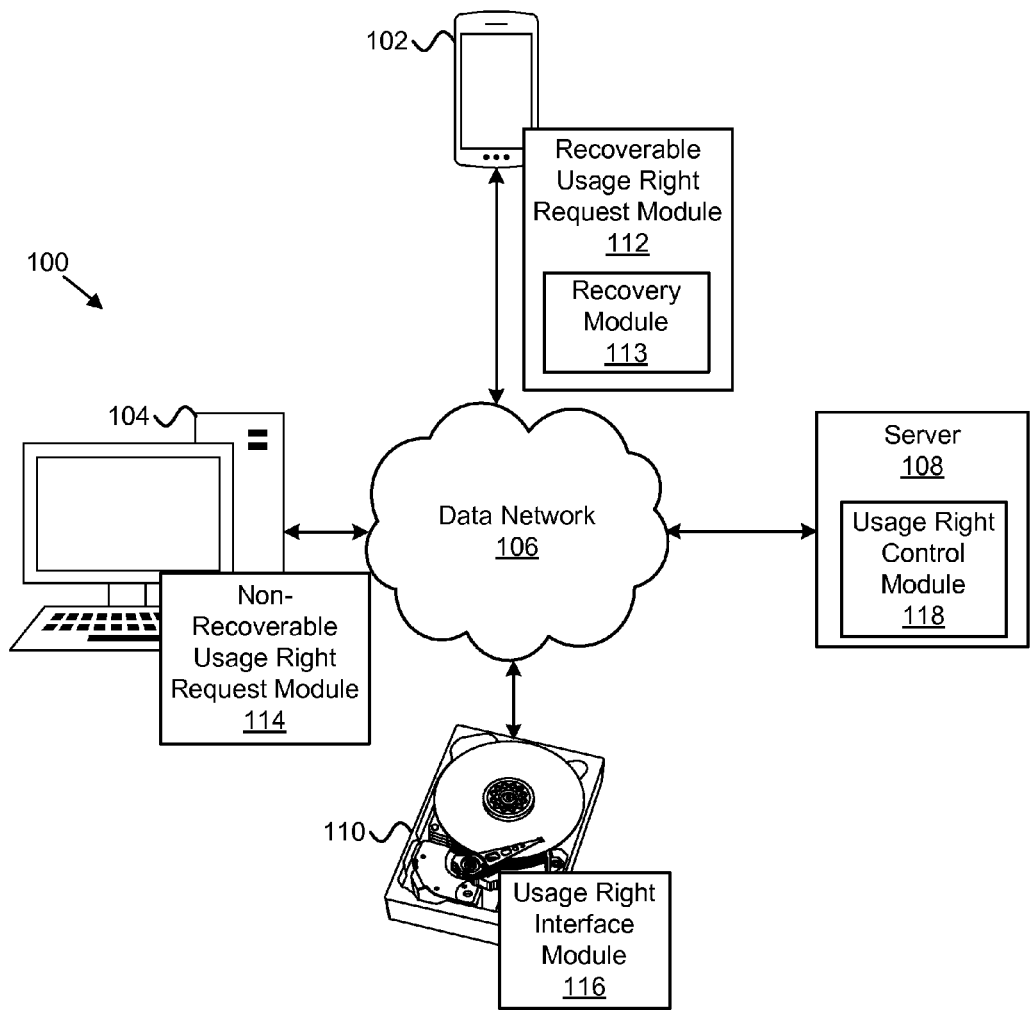
FIG. 1 is a schematic block diagram illustrating one embodiment of a digital rights management system.

FIG. 1 illustrates one embodiment of a digital rights management system 100. The system 100, in certain embodiments, includes information handling devices 102, 104, digital communication data network 106, a server 108, a data storage device 110, usage right request modules 112, 114 and usage right interface module 116, which are described in more detail below. Although the system 100 illustrated in FIG. 1 includes a certain number and intercommunication configuration of elements, such as two information handling devices 102, 104, two usage right request modules 110, 112, one server 108, one data storage device 110, and one usage right interface module 114, each in communication with a single data network 106, in other embodiments, the system can include any number of and intercommunication configuration of elements as desired without departing from the essence of the present disclosure.

The information handling device 102, in one embodiment, may include one or more mobile computing devices, such as smart phones, tablet computers, laptops, optical head mounted displays, smart watches, and/or the like. In one embodiment, the information handling device 104 can include one or more immobile or stationary computing devices, such as desktop computers, servers, and/or the like. In some embodiments, the information handling devices 102, 104 include operating systems, such as various versions of mobile and desktop operating systems provided by Microsoft®, Apple®, Linux, Android, and/or the like. For example, the information handling device 102 may include a tablet running a version of Apple® iOS, a smart phone running a version of Windows® Mobile, and a laptop running a distribution of Linux.

The data network 106, in certain embodiments, is a digital communication network that transmits digital communications between the information handling devices 102, 104, the server 108, and/or the data storage device 110. In some implementations, the data network 106 may include a wireless network, such as a wireless telephone network, a local wireless network, such as a Wi-Fi network, a Bluetooth® network, and the like. In yet some implementations, the data network 106 may include a wide area network ("WAN"), a storage area network ("SAN"), a local area network ("LAN"), an optical fiber network, the internet, or other digital communication network known in the art. Furthermore, the data network 106 can include, or be, one or more data transmission lines or connections, such as, for example, USB, ATA, eSATA, and Thunderbolt® lines and connections. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory ("RAM"), or the like.

The server 108 can be one or more servers. Each server, in one embodiment, includes main frame computers, desktop computers, laptop computers, cloud servers, smart phones, tablet computers, and/or the like. According to some embodiments, the server 108 can be a data storage device, such as a hard disk drive or solid state drive. In one embodiment, the information handling devices 102, 104 are communicatively coupled to the server 108 through the data network 106. In another embodiment, the information handling devices 102, 104 access data stored on the server 108 through the data network 106. In some implementations, the server 108 includes a usage right control module 118 that controls the distribution of usage rights between information handling devices of the network 100. More specifically, the usage right control module 118 receives usage right requests from information handling devices, processes the requests, and transfers or controls the transfer of usage rights to the information handling devices. In certain embodiments, the usage right control module 118 includes a plurality of modules that perform the operations of the usage right control module. The usage right control module 118, with its accompanying modules, and according to one embodiment, can have similar features as the usage right control module 300 described below in more detail with reference to FIG. 3.

The data storage device 110 can be one or more data storage devices. Each data storage device 110, in one embodiment, includes a hard disk drive, an optical drive, non-volatile memory, RAM, and/or the like. In one embodiment, the data storage device 110 is communicatively coupled to the server 108 through the data network 106. In certain implementations, the data storage device 110 forms part of the server 108. The information handling devices 102, 104 may access data stored on the data storage device through the data network 106 via the server 108 or directly from the data storage device. In some implementations, the data storage device 110 may include a usage right interface module 116 that interfaces with the network 106 to receive commands to release or prevent the release of usage rights stored on the data storage device. Also, the usage right interface module 116 interfaces with the network 106 to receive and store new or used (e.g., expired) usage rights, as well as to erase stored usage rights if desired.

The recoverable usage right request module 112 forms part of, is stored on, or is executed by the information handling device 102 in one implementation. Generally, the recoverable usage right request module 112 requests a usage right or license to use or access digital content. The digital content can be stored on the information handling device 102, server 108, data storage device 110, and/or any other electronic device. Additionally the recoverable usage right request module 112 includes a recovery module 113 that requests the recovery of one or more usage rights corresponding with interrupted usage right requests. For example, the recoverable usage right request module 112 may request from the usage right control module 118 a usage right to access digital content. On occasion, processing of the usage right request by the control module 118 and/or transmitting the associated usage right from the control module to the request module 112 may be interrupted for various reasons, such as a network disconnection. Accordingly, because of the interruption, the request and transfer of usage rights from the control module 118 to the request module 112 is not fully completed. In order to complete the transfer of usage rights, the recovery module 113 of the request module 112 requests the recovery of usage rights (e.g., the completion of an interrupted usage right request and transfer process). The recovery module 113 may be configured to automatically or manually (e.g., via user interaction) request the recovery of usage rights after an interruption. In certain embodiments, the usage right request modules 112, 114, each includes a plurality of modules that perform the operations of the respective request modules.

The non-recoverable usage right request module 114 forms part of, is stored on, or is executed by the information handling device 104 in one implementation. Generally, like the recoverable usage right request module 112, the non-recoverable usage right request module 114 requests a usage right or license to use or access digital content. However, in contrast to the recoverable usage right request module 112, the non-recoverable usage right request module 114 does not include a recovery module. Accordingly, the non-recoverable usage right request module 114 does not or cannot request the recovery of one or more usage rights in the event of a disconnection causing interruption of the usage right requests. Rather, the non-recoverable usage right request module 114 generates a new request for usage rights (as opposed to a request for recovery of previously requested usage rights) should a usage right request generated by the non-recoverable usage right request module be interrupted.

Although in the illustrated embodiments the recoverable usage right request module 112 is shown associated with (e.g., forming part of) the mobile information handling device 102, and the non-recoverable usage right request module 114 is shown associated with the non-mobile information handling device 104, in other embodiments, the recoverable usage right request module 112 is associated with the non-mobile information handling device 104, and the non-recoverable usage right request module 114 is associated with the mobile information handling device 102. Further, although the recoverable usage right request module 112, non-recoverable usage right request module 114, and usage right control module 118 of the system 100 are shown forming part of separate, disparate elements or devices, two or more of the modules may form part of the same element or device.

Figure 2:
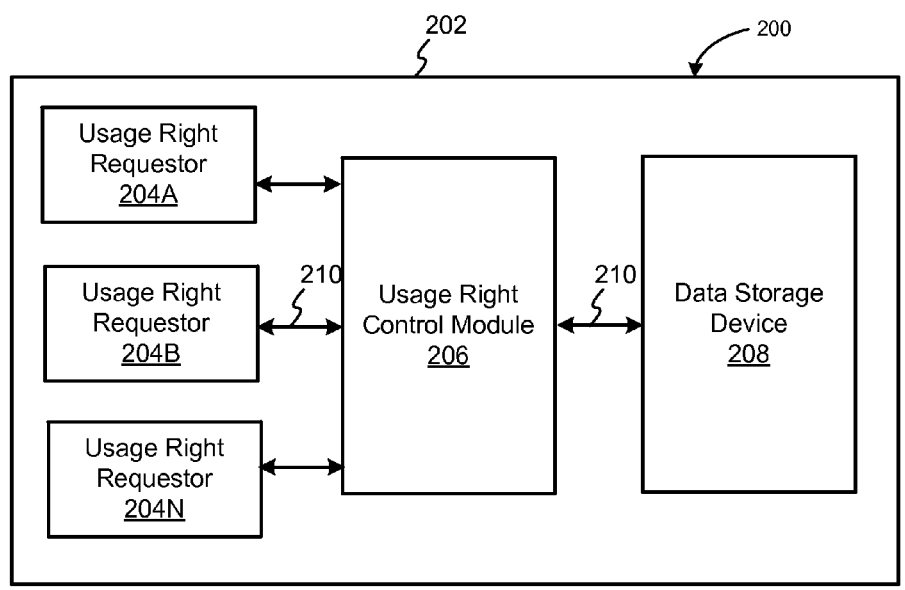
FIG. 2 is a schematic block diagram illustrating another embodiment of a digital rights management system.

Also, although the information handling devices 102, 104, server 108, and data storage device 110 are shown as separate, disparate elements or devices that communicate with each other over a data network 106, two or more of these elements or devices may form part of the same element or device. For example, referring to FIG. 2, a digital management system 200 includes an electronic device 202, which can be any of various mobile or non-mobile information handling devices, servers, and the like. In one implementation, the electronic device 202 is a single, self-contained device, such as, for example, a mobile phone, laptop, desktop computer, and the like. The electronic device 202 houses a plurality of usage right requestors 204A-N, a usage right control module 206, and a data storage device 208. Although the usage right control module 206 is shown separate from the data storage device 208, in some implementations, the usage right control module 206 can form part of or be included in the data storage device 208, which can be a hard disk drive or solid state drive. The electronic device 202 can include any number of usage right requestors, including usage right requestor 204A, usage right requestor 204B, up to usage right requestor 204N. Each usage right requestor 204A-N can represent any of various modules, applications, users, programs, etc. that may require access to a usage right for achieving a certain functionality.

In certain implementations, the usage right requestors 204A-N each includes one of a recoverable usage right request module or non-recoverable usage right request module. In some embodiments, at least one of the usage right requestors 204A-N includes a recoverable usage right request module and another one of the usage right requestors 204A-N includes a non-recoverable usage right request module. The usage right requestors 204A-N each request from a usage right control module 206 one or more usage rights stored on the data storage device 208. The usage right requestors 204A-N may communicate with the usage right control module 206, and the usage right control module 206 may communicate with the data storage device 208, via data communication lines 210. The data communication lines 210 can be any of various data communication lines, such as such as, for example, an internal bus. The usage right control module 206, with its accompanying modules, and according to one embodiment, can have similar features as the usage right control module 300 described below in more detail with reference to FIG. 3. In one implementation, the usage rights are uploaded onto the data storage device 208 via a data network from a usage right issuer. In other implementations, the usage rights are uploaded onto the data storage device 208 from a computer readable medium, such as CD-ROM, DVD-ROM, and the like.

Figure 3:
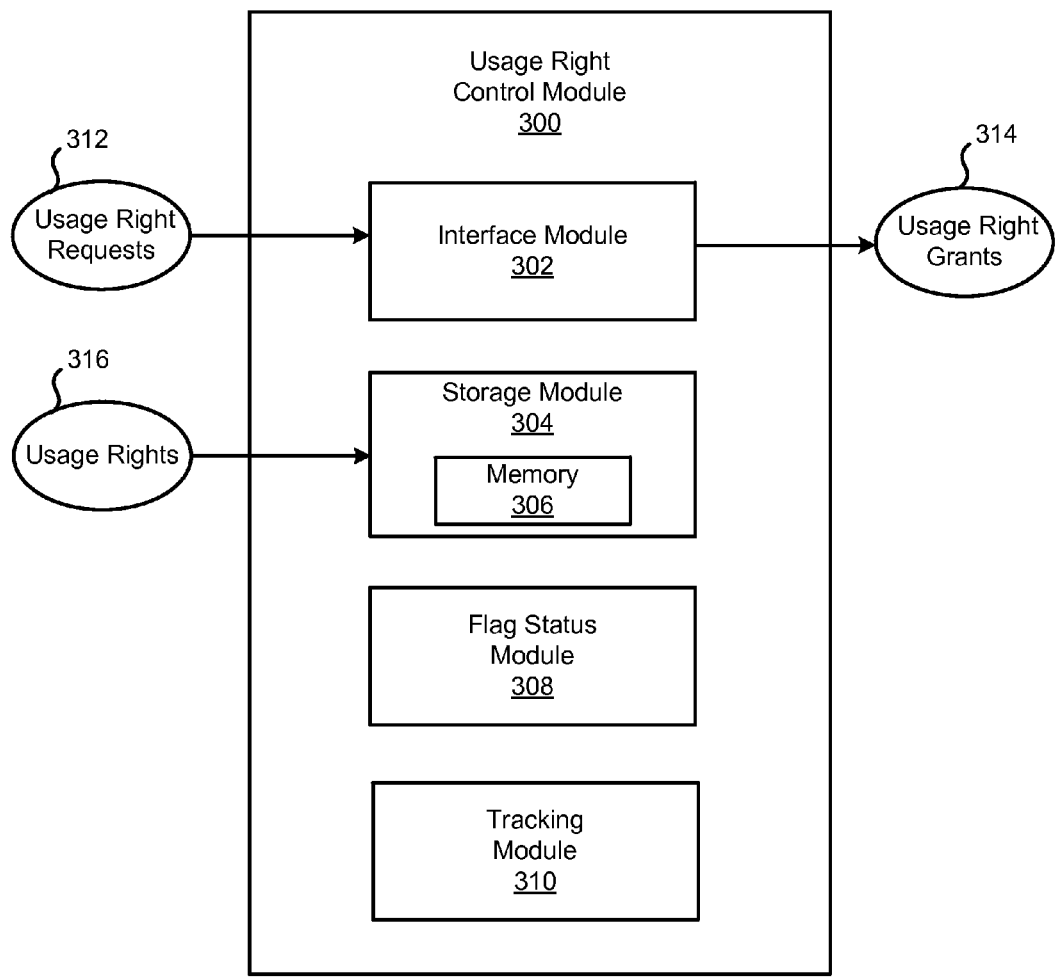
FIG. 3 is a schematic block diagram illustrating one embodiment of a usage right control module.

Referring to FIG. 3, a usage right control module 300 of a digital rights management system includes an interface module 302, a storage module 304, a flag status module 308, and a tracking module 310. Generally, the interface module 302 interfaces (e.g., directly or indirectly) with usage right request modules of the system to receive usage right requests 312. The usage right requests 312 are processed by the usage right control module 300 to determine if such requests should be allowed or granted. If a usage right request 312 is granted by the usage right control module 300, the interface module 302 transfers the usage right to the usage right request module that is requesting the usage right as a usage right grant 314. The usage right grant 314 may include the actual digital usage right or a copy of the digital usage right. Alternatively, the usage right grant 314 may include access information or credentials for accessing the usage right.

The usage rights 316 can be stored on the storage module 304, which includes a memory 306. In one implementation, the usage rights 316 are stored in a tamper resistant portion of the memory 306 to prevent unauthorized access to or modification of the usage rights. Although the storage module 304 is shown forming part of the usage right control module 300, the storage module 304 and/or the memory 306 may be separate from the usage right control module 300. The usage right requests 312 and usage rights 316 may be transmitted to, and the usage right grants 314 may be transmitted from, the usage right control module 300 over a multi-device or single-device data network.

The flag status module 308 generates a usage right flag for each usage right 316, or group of usage rights, and stores the usage right flag in the memory 306 of the storage module 314. In one implementation, the usage right flag is stored in a tamper resistant portion of the memory 306 to prevent unauthorized access to or modification of the usage right flags. The flag status module 308 also sets and stores a status of the usage right flag. In some implementations, the status of each usage right flag is set to one of a first, second, or third condition or transfer status. The first condition or transfer status can represent a non-transferred usage right or a usage right that has not been requested. The second condition or transfer status can represent a recovery condition or requested usage right from a device with a recovery mechanism and whose transfer has not been completed. For example, the second transfer status may indicate that the request for the associated usage right is a recoverable request. The second condition prompts certain actions when the digital rights management system is operating in a recovery mode following an interruption or disconnection of the system while a usage right transfer is in process. The third condition or transfer status can represent a fully transferred usage right. In some implementations, the flag can be set to a fourth condition or transfer status that represents a non-recovery condition or requested usage right from a device without a recovery mechanism and whose transfer has not been completed.

When usage rights are received initially, the flag status module 308 may set the status of each usage right flag to the first status. The status of a given usage right flag will remain the first status until a transfer of the usage right associated with the flag is requested by a recoverable usage right request module, at which time the flag status module 308 will set the status of the usage right flag to the second or recovery status. The flag status can remain in the second status until the usage right is recovered by the recoverable usage right request module, at which time the flag status can be changed to the third or transferred status. In certain implementations, if the transfer of the usage right is requested by a non-recoverable usage right request module, then the flag remains set to the first status until the transfer is complete, at which time the flag status is changed to the third or transferred status. The transfer of a usage right can be interrupted when a disconnection occurs between a usage right control module and a usage right requestor or request module after the transfer of the usage right has been granted, but before the entirety of the usage right is received by the usage right requestor or request module. In some implementations, the usage right requestor or request module may forward to the usage right control module a receipt confirmation when the entirety of the usage right has been received by the requestor or request module. Alternatively, in certain implementations, the usage right control module may assume the usage right has been transferred to the requestor in its entirety if no disconnection has occurred and/or no recovery request has been received from the requestor.

The tracking module 310 is configured to generate, store, and update a log file for tracking information regarding usage rights. In one embodiment, the log file tracks the use history of usage rights, such as when a usage right is granted and transferred, what device is currently using the usage right, when the usage right is returned. Additionally, the tracking module 310 keeps an accounting (e.g., copy count) of the total number of usage rights, the number of usage rights in use, and the number of usage rights not in use. In some implementations, the tracking module 310 includes a memory for storing the log file.

Figure 4:
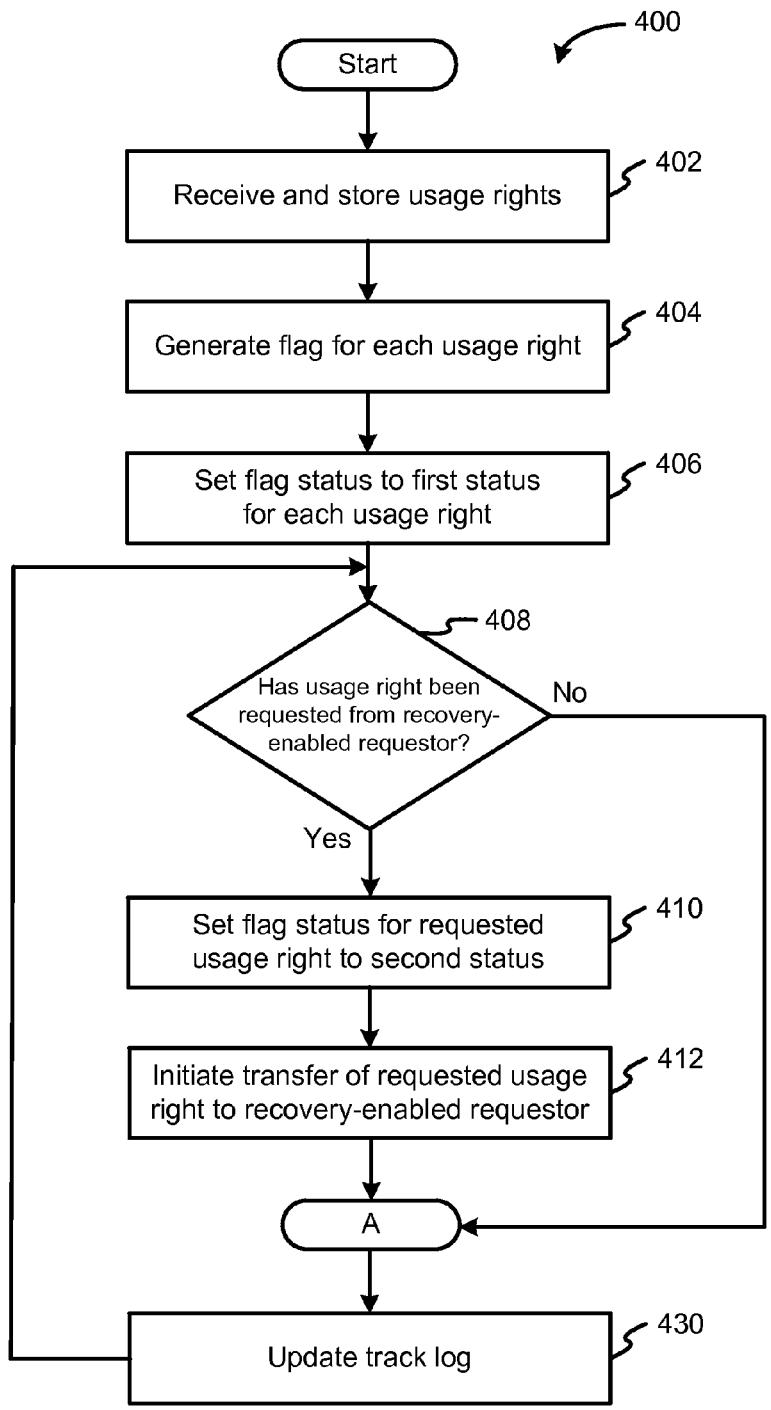
FIG. 4 is a schematic flow diagram illustrating one embodiment of a method for managing digital rights according to one embodiment.

Referring to FIG. 4, one embodiment of a method 400 for managing digital rights is shown. In one implementation, the method 400 can be executed by the digital rights management systems and associated modules and devices described and shown above. The method 400 starts by receiving and storing usage rights for accessing digital content at 402. The usage rights can be stored on a data storage device, such as the data storage device 110. Additionally, following receipt of the usage rights, the method may include generating a log file for the usage rights. The method 400 also includes generating a flag for each usage right at 404. The status of the flag for each usage right is set to a first status at 406. The first status can be associated with a non-transferred usage right when the digital rights management system is operating in a non-recovery or normal mode. Generally, a digital rights management system is operating normally or in a non-recovery mode when no network disconnections or interruptions are present.

The method 400 includes determining whether a usage right has been requested from a recovery-enabled requestor at 408. The recovery-enabled requestor can be a device having a recoverable usage right request module, such as the module 112, or the recovery-enabled requestor can be the recoverable usage right request module itself. The usage right request may be received by a usage right control module, such as the module 118, which can be located on a server, such as the server 108, or any of various information handling devices. If a usage right is requested from the recovery-enabled requestor at 408 and the request is granted (e.g., the status of the flag was set to the first status), the method 400 sets the status of the flag associated with the requested usage right to a second status at 410. The second status can be associated with a recoverable usage right (e.g., a usage right that has been requested by a recovery-enabled requestor) whose transfer process has not yet been completed. In certain implementations, the status of the flag is set to the second status at 410 before the digital rights management system experiences a disconnection and enters operation in the recovery mode. However, if a usage right is not requested from a recovery-enabled requestor at 408, then the method 400 essentially skips actions 410, 412 and proceeds to sub-process A.

After the flag is set to the second status at 410, the method 400 initiates the transfer of the requested usage right to the recovery-enabled requestor at 412. In some implementations, initiation of the transfer may include initiation of the physical transfer of the usage right to the recovery-enabled requestor. In yet certain implementations, initiation of the transfer can include decreasing a copy count of the usage rights according to the number of usage rights granted and/or updating the log file with usage right transfer information. Additionally, the usage right transfer process may include updating (e.g., merging) a sector or element of the usage right with the updated flag status and/or writing a back-up of the usage right to be transferred to a tamper resistant area of a memory, such as a data storage device, which can be the same tamper resistant area where the usage rights are stored.

Figure 5:
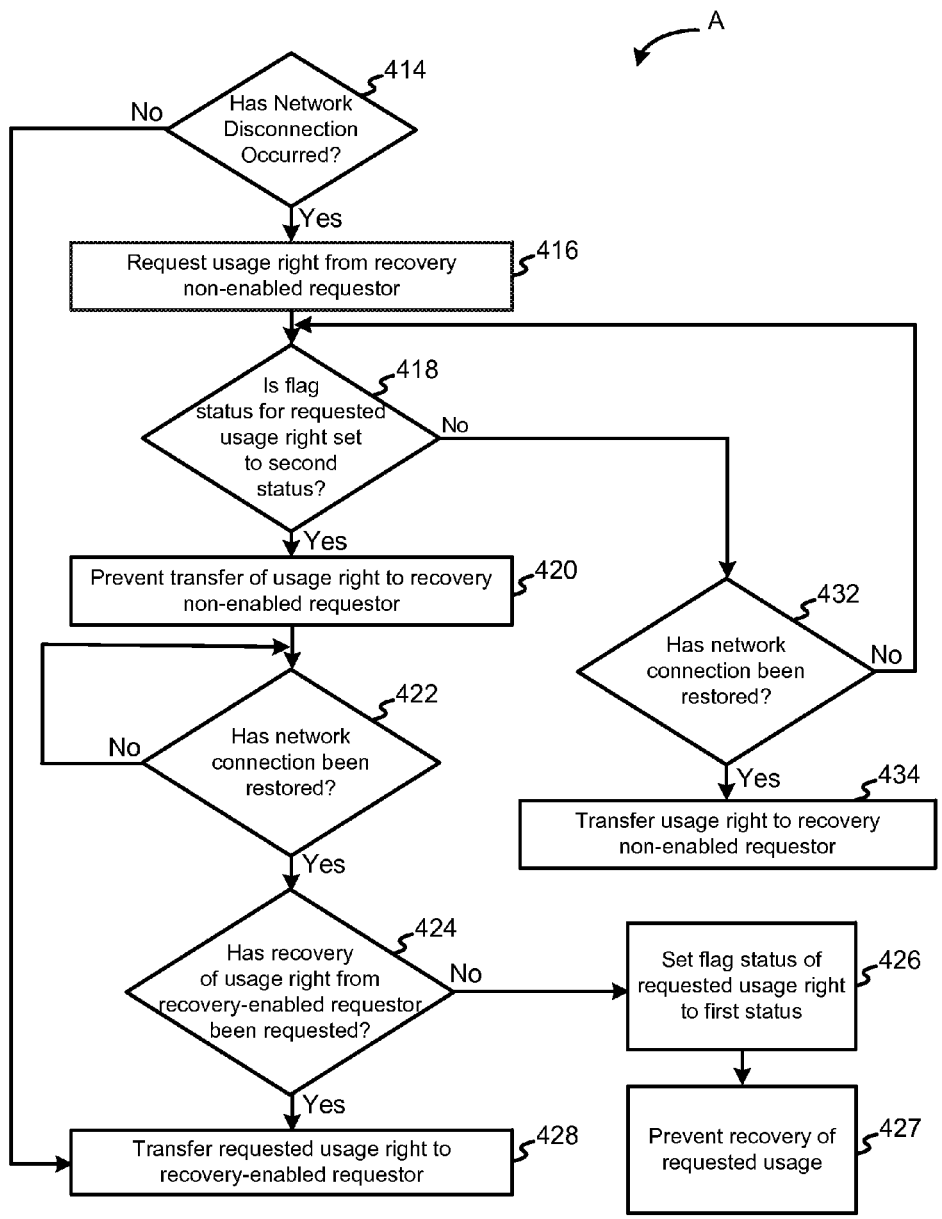
FIG. 5 is a schematic flow diagram illustrating one embodiment of a sub-process of the method of FIG. 4.

The method 400 then executes the sub-process A, which is shown in FIG. 5, before updating a track log or log file at 430 to reflect usage right status information stemming from the execution of the sub-process A. Part of updating the log file at 430 may include setting the flag of a usage right to a third status indicating the usage right has been transferred (e.g., the transfer of the usage right has been completed). In sub-process A, the method 400 includes determining whether a network disconnection has occurred at 414. If a network disconnection has not occurred, as determined at 414, then the digital rights system remains in a normal operating mode and the method 400 proceeds to complete the transfer of the requested usage right to the recovery-enabled requestor at 428. When the transfer is completed, the recovery-enabled requestor 428 can confirm, such as to a usage right control module, that the usage right was received. The status of the flag can then be set to a third status associated with a transferred usage right. However, when the transfer of the usage right has not been completed (e.g., a receipt confirmation has not been received), and/or a network disconnection has occurred as determined at 414 such that operation of the digital rights management system is changed to a recovery mode, another request for the requested usage right that was initiated at 412 may be received from a recovery non-enabled requestor at 416. The recovery non-enabled requestor can be a device lacking a recoverable usage right request module (e.g., has a non-recoverable usage right request module), or a non-recoverable usage right request module itself.

The method 400 includes checking whether the flag for the requested usage right is set to the second status (or third status) at 418 and if so, the method prevents the transfer of the requested usage right to the recovery non-enabled requestor at 420. However, if the flag for the requested usage right is set to the first status as determined at 418, then the method 400 checks the network connection at 432. If the network connection has not been restored, then the method 400 returns to ensure the flag status is not set to the second (or third) status at 418. After the network connection has been restored at 434, the method 400 transfers the requested usage right to the recovery non-enabled requestor at 434 and the sub-process A ends.

Should the method 400 prevent the transfer of the requested usage right to the recovery non-enabled requestor at 420, then the method checks the network connection until it has been restored at 422. After the network connection has been restored at 422, the method 400 includes determining whether a request for recovery of the usage right by the recovery-enabled requestor has occurred at 424. Generally, the request from the recovery-enabled requester is to recover the usage right associated with the usage right transfer that was interrupted due to a network disconnection. The method 400 determines whether the flag for the usage right associated with the recovery request is set to the second status at 426. If the recovery-enabled requestor has requested a recovery of the usage right as determined at 424, then the method 400 transfers the requested usage right for which recover is sought to the recovery-enabled requestor at 428, thus effectively recovering the usage right whose transfer was original interrupted, and the sub-process A ends. The transfer of the recovered usage right may prompt the log file to be updated, such as by decreasing a copy count of the usage rights.

However, if the recovery-enabled requestor has not requested a recovery of the usage right as determined at 424, then the method 400 proceeds to set the flag status of the requested usage right back to the first status at 426. Then, the method 400 is configured to prevent recovery of the requested usage right to the recovery-enabled requestor at 427 and the sub-process A ends. In some implementations, a recovery non-enabled requestor can be configured to change or request to change the flag status from the second status to the first status. Such a situation may occur when a recovery-enabled requestor has not or will not request the recovery of a previously requested usage right for any of a variety of reasons. For example, in one implementation, if recovery of a previously requested usage right is not requested by a recovery-enabled requestor within a predetermined time period after the network disconnection has been restored at 422, then a request for the previously requested usage right by a recovery non-enabled requestor will result in a change in the flag status from the second to the first status, which will allow the transfer of the previously requested usage right to the recovery non-enabled requestor.

Basically, in some implementations, the method 400 includes operating a digital rights management system in a recovery mode during a network interruption, flagging and securely storing usage rights that have been requested by devices with a recovery module, preventing access to usage rights that have been requested by devices without a recovery module during operation in the recovery mode, and recovering the flagged usage rights for transfer to the devices with the recovery module after the network interruption is resolved and normal operation has resumed.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

Aspects of the embodiments may be described above with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A digital rights management system, comprising:
   a memory having a tamper-resistant portion;
   a storage module that stores a usage right for digital content in the tamper-resistant portion of the memory;
   a flag status module that generates a flag corresponding with a transfer status of the usage right, sets the flag to one of a plurality of transfer statuses, and stores the flag in the tamper-resistant portion of the memory, wherein the transfer statuses comprise a status indicating a request for the usage right was generated by a device with a usage right recovery mechanism; and a usage right control module that denies a request for a transfer of the usage right to a device without a usage right recovery mechanism when the transfer status of the flag is set to the status indicating a request for the usage right was generated by a device with a usage right recovery mechanism;

wherein the request for the transfer of the usage right to a device without a usage right recovery mechanism is made during a network interruption.

2. The digital rights management system of claim 1, wherein the transfer statuses comprise a status indicating a request for the usage right was generated by a device without a usage right recovery mechanism.

3. The digital rights management system of claim 1, wherein the transfer statuses comprise a status indicating a request for the usage right has not been received.

4. The digital rights management system of claim 1, wherein the usage right control module approves a request for a transfer of the usage right to the device with the usage right recovery mechanism when the transfer status of the flag is set to the status indicating a request for the usage right was generated by the device with the usage right recovery mechanism.

5. The digital rights management system of claim 1, further comprising a tracking module that maintains a log file comprising a use history of the usage right.

6. The digital rights management system of claim 1, wherein a copy of the flag is merged into the usage right.

7. The digital rights management system of claim 1, wherein the usage right recovery mechanism comprises a recoverable usage right request module, and wherein the device comprises a non-recoverable usage right request module.

8. The digital rights management system of claim 1, wherein the device with the usage right recovery mechanism is a first device, the usage right recovery mechanism comprising a recoverable usage right request module, and the system further comprising a second device separate from the first device, wherein the second device comprises a non-recoverable usage right request module.

9. A method for managing digital rights, comprising:
storing a usage right for digital content in a tamper-resistant portion of a memory;
generating a flag for the usage right;
setting the flag to a first status;
storing the flag in the tamper-resistant portion of the memory;
receiving a request for the usage right from a device having a usage right recovery mechanism;
setting the flag to a second status in response to receiving the request;
wherein the second status indicates the request is a recoverable request;
receiving a request for the usage right from a device without a usage right recovery mechanism; and
denying the request for the usage right from the device without the usage right recovery mechanism when the flag for the usage right is set to the second status;
wherein the request for the usage right from the device without a usage right recovery mechanism is received during a network interruption.

10. The method of claim 9, further comprising:
receiving a request to recover the usage right from the device having a usage right recovery mechanism after a transfer of the usage right to the device having a usage right recovery mechanism has been interrupted; and
transferring the usage right to the device having a usage right recovery mechanism in response to receiving the request to recover the usage right if the flag for the usage right is set to the second status.

11. The method of claim 9, further comprising adding a copy of the flag to the usage right.

12. The method of claim 9, further comprising transferring the usage right to the device having a usage right recovery mechanism, and setting the flag to a third status indicating the usage right has been transferred.

13. The method of claim 9, wherein the usage right recovery mechanism is associated with a recoverable usage right request module of the device, the request for the usage right being received from the recoverable usage right request module, and wherein the device comprises a non-recoverable usage right request module, the method further comprising receiving a request for the usage right from the non-recoverable usage right request module, approving the request for the usage right from the recoverable usage right request module when the flag for the usage right is set to the second status, denying the request for the usage right from the non-recoverable usage right request module when the flag for the usage right is set to the second status, and approving the request for the usage right from the non-recoverable usage right requested module when the flag for the usage right is set to the first status.

14. The method of claim 9, further comprising updating a log file with use history information associated with the usage right.

15. A method for managing digital rights, comprising:
storing a usage right for digital content in a tamper-resistant portion of a memory;
generating a flag for the usage right and setting the flag to a non-use status;
storing the flag in the tamper-resistant portion of the memory;
receiving a request for the usage right from a device having a usage right recovery mechanism and setting the flag to a recoverable status in response to receiving the request;
transferring the usage right to the device having a usage right recovery mechanism and stopping the transfer of the usage right to the device having a usage right recovery mechanism in response to a network interruption;
receiving a request for the usage right from a device without a usage right recovery mechanism during the network interruption and denying the request for the usage right from the device without a usage right recovery mechanism when the flag is set to the recoverable status; and
receiving a request to recover the usage right from the device having a usage right recovery mechanism after the network interruption is resolved, approving the request to recover when the flag is set to the recoverable status, and disapproving the request to recover when the flag is set to the non-use status.

* * * * *

UNITED STATES PATENT AND TRADEMARK OFFICE
CERTIFICATE OF CORRECTION

PATENT NO. : 9,460,027 B2
APPLICATION NO. : 14/605687
DATED : October 4, 2016
INVENTOR(S) : Dai Yun et al.

Page 1 of 1

It is certified that error appears in the above-identified patent and that said Letters Patent is hereby corrected as shown below:

In the Specification

Column 7, Lines 45-46:
"such as such as" ---should read "such as"

Column 10, Line 67:
"recover" ---should read "recovery"

Column 11, Line 2:
"original" ---should read "originally"

Column 12, Lines 15-16:
"on in" ---should read "on or in"

Signed and Sealed this
Twenty-seventh Day of December, 2016

Michelle K. Lee
*Director of the United States Patent and Trademark Office*